US007041028B2

(12) United States Patent
Foelsche

(10) Patent No.: US 7,041,028 B2
(45) Date of Patent: May 9, 2006

(54) INITIALIZATION OF A CONTROL UNIT

(75) Inventor: Volkmar Foelsche, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 10/825,573

(22) Filed: Apr. 15, 2004

(65) Prior Publication Data

US 2004/0267426 A1 Dec. 30, 2004

(30) Foreign Application Priority Data

Apr. 17, 2003 (DE) ................................ 103 17 653

(51) Int. Cl.
*B60K 1/02* (2006.01)
*B60K 6/04* (2006.01)
*G06F 19/00* (2006.01)

(52) U.S. Cl. ........................... 477/3; 701/113; 903/941

(58) Field of Classification Search ................ 477/3–5; 701/113; 903/906, 941–2
See application file for complete search history.

(56) References Cited

U.S. PATENT DOCUMENTS 5,434,800 A * 7/1995 Davis et al. ................ 701/113
5,495,127 A * 2/1996 Aota et al. .................. 903/941
6,373,206 B1 * 4/2002 Morimoto et al. .......... 318/139
6,609,488 B1 * 8/2003 Nagae et al. ............... 701/113
6,763,903 B1 * 7/2004 Morimoto et al. ............. 477/3
6,807,934 B1 * 10/2004 Kataoka et al. .......... 123/179.4
6,832,151 B1 * 12/2004 Kumazaki et al. .......... 701/113
2003/0006076 A1 * 1/2003 Tamor ....................... 180/65.2

FOREIGN PATENT DOCUMENTS

DE 198 53 451 5/2000

* cited by examiner

*Primary Examiner*—Roger Pang
(74) *Attorney, Agent, or Firm*—Kenyon & Kenyon, LLP

(57) ABSTRACT

A control unit for controlling an internal combustion engine in a motor vehicle passes through an initialization phase after power-on. To start the internal combustion engine, the internal combustion engine is synchronized with the control unit. To initialize a control unit in a way that enables the internal combustion engine controlled by this control unit to be started particularly quickly, the following steps are carried out irrespective of their order as a function of the detected start request probability: the vehicle is checked and, if necessary, secured to prevent rolling; an interruption in the flow of power between the internal combustion engine and the driven wheels is ensured; the internal combustion engine is set in motion by an electric motor; the control unit is synchronized with the internal combustion engine so that a position of the internal combustion engine is detected by the control unit; the electric motor is deactivated; the control unit is placed in a standby mode and waits for a start request.

12 Claims, 3 Drawing Sheets

INITIALIZATION OF A CONTROL UNIT

FIELD OF THE INVENTION

The present invention relates to a method for initializing a control unit for controlling an internal combustion engine in a vehicle, a start request probability being detected as a function of a signal of a detecting device and a start request being detected as a function of a signal of a further detecting device. The present invention also relates to a control unit, in particular a control unit in an internal combustion engine in a vehicle, the control unit being assigned an assignment for detecting a start request probability and an arrangement for detecting a start request. The present invention further relates to a computer program that is able to run on a control unit, in particular on a microprocessor.

BACKGROUND INFORMATION

Common control units today, in particular control units in motor vehicles, pass through an initialization phase after power-on. During this initialization phase, for example, control programs are loaded to the control unit's main memory, values previously stored in a memory area are loaded to the main memory, values are input from sensors that are connected to the control unit via data lines, and/or the input values are subjected to plausibility checks.

An initialization phase of this type lasts hundreds of milliseconds. If this initialization phase begins with a start request, for example by turning the ignition key, the actual start of the internal combustion engine is delayed by this period of time.

In modern internal combustion engines, the initialization of a control unit also involves synchronizing the internal combustion engine with the control unit. This is necessary because information about a present state of the internal combustion engine must be available to start the internal combustion engine. For example, to correctly control the injection and ignition apparatus, the position of at least one cylinder must be detected and transmitted to the control unit. Once the position of a cylinder is known, the control unit is able to determine the positions of the remaining cylinders therefrom. In the case of a cylinder 1 detection, the position of a cylinder identified as "cylinder 1" is detected for this purpose.

A control unit is typically initialized by a request from the user to start the internal combustion engine (start request). The required synchronization of the control unit with the internal combustion engine is carried out, for example, while the internal combustion engine is being placed in rotary motion by the starter. Suitable sensors are used to detect cylinder 1, which may last as long as two crankshaft rotations. Fuel is then injected, and the resulting fuel-air mixture is ignited in the combustion chamber of a cylinder. A period of over one second may therefore pass from the start request to actual starting of the internal combustion engine, which is a nuisance to the user.

A method for activating interconnected network components that are preferably installed in a vehicle is described in German Patent Application No. DE 198 53 451. One network component of this type, for example, is a control unit that communicates with measuring devices via a network, for example a bus system such as the Controller Area Network (CAN). A detecting device generates a signal when a request to start the network components is likely (start request probability). As a function of a signal of this type, a first network component sends a message via the bus system, which activates the remaining network components. The first network component must be either permanently active or have a signal input via which this first network component is activatable when a signal is present at this input. If a start request probability is detected, all network components are activated. However, if no use is actually made thereof because a user merely opened the vehicle door to remove an item located in the vehicle, for example, the active network components are deactivated again after a predetermined interval. The network components are reactivated if a usage probability is redetected. As a result, the entire network may be activated and deactivated multiple times without an actual starting operation taking place. This consumes power unnecessarily. In particular, this method does not result in the control unit being synchronized with the internal combustion engine.

SUMMARY

An object of the present invention is to provide an arrangement for initializing a control unit in such a way that an internal combustion engine controlled by this control unit may be started particularly quickly.

This object may be achieved by providing a method in which the following steps are carried out irrespective of their order as a function of the detected start request probability: the vehicle is checked and, if necessary, secured to prevent rolling; an interruption in the flow of power between the internal combustion engine and the driven wheels is ensured; the internal combustion engine is set in motion by an electric motor; the control unit is synchronized with the internal combustion engine so that the control unit detects a position of the internal combustion engine; the electric motor is deactivated; the control unit switches to a standby mode and waits for a start request.

In an example embodiment according to the present invention, the control unit is initialized and thus, in particular, also synchronized even before a start request is issued by the driver. As a result, the engine may be started particularly quickly as a function of a start request. The start request probability is detected, for example by suitable sensors, as soon as a driver is present in the vehicle. The actual start request may then be issued by turning the ignition key or operating a starter switch. This saves time in performing the actual starting process because the control unit and the internal combustion engine are already synchronized at the time the start request is issued.

According to an advantageous refinement, the data describing the synchronization of the internal combustion engine with the control unit is stored, and the control unit switches to an inactive mode unless a start request is detected within a predefinable period of time. As a result, the control unit does not remain activated, thus consuming energy, unless a start request is issued within the predefinable period of time.

The control unit is advantageously synchronized with the internal combustion engine only if no data describing this synchronization is stored. This avoids resynchronizing the control unit with the internal combustion engine if a start request probability is detected multiple times without an actual start request taking place in the meantime. Unnecessary wear on the electric motor and unnecessary power consumption are thus avoided.

According to an example embodiment of the present invention, the control unit switches to an active mode upon detection of a start request. When the control unit switches from inactive mode to active mode, the stored data describing the synchronization of the internal combustion engine with the control unit is output. When the internal combustion engine is started, this avoids a resynchronization even if the control unit is no longer in initialization mode (init mode) as a result of an exceeded period of time, but is already in standby mode.

An implementation of the present invention in the form of a computer program may be particularly significant. In this case, the computer program is executable on an arithmetic unit or a control unit, in particular a microprocessor, and it is suitable for carrying out the method according to the present invention. In this case, an example embodiment of the present invention is therefore implemented by the computer program so that this computer program represents the present invention in the same manner as the method that the computer program is suitable to perform. The computer program is preferably stored in a memory element. In particular, a random access memory, a read-only memory or a flash memory may be used as the memory element.

An object of the present invention may also be achieved by providing a control unit of the type mentioned above that is programmed to carry out the method according to the present invention.

BRIEF DESCRIPTION OF THE DRAWINGS

Further features, possible applications and advantages of the present invention are derived from the following description of exemplary embodiments of the present invention, which are illustrated in the figures. All features described or illustrated herein form the object of the present invention either alone or in any combination, irrespective of their combination as well as irrespective of their formulation or representation in the description or the figures.

DESCRIPTION OF EXAMPLE EMBODIMENTS

Figure 1:
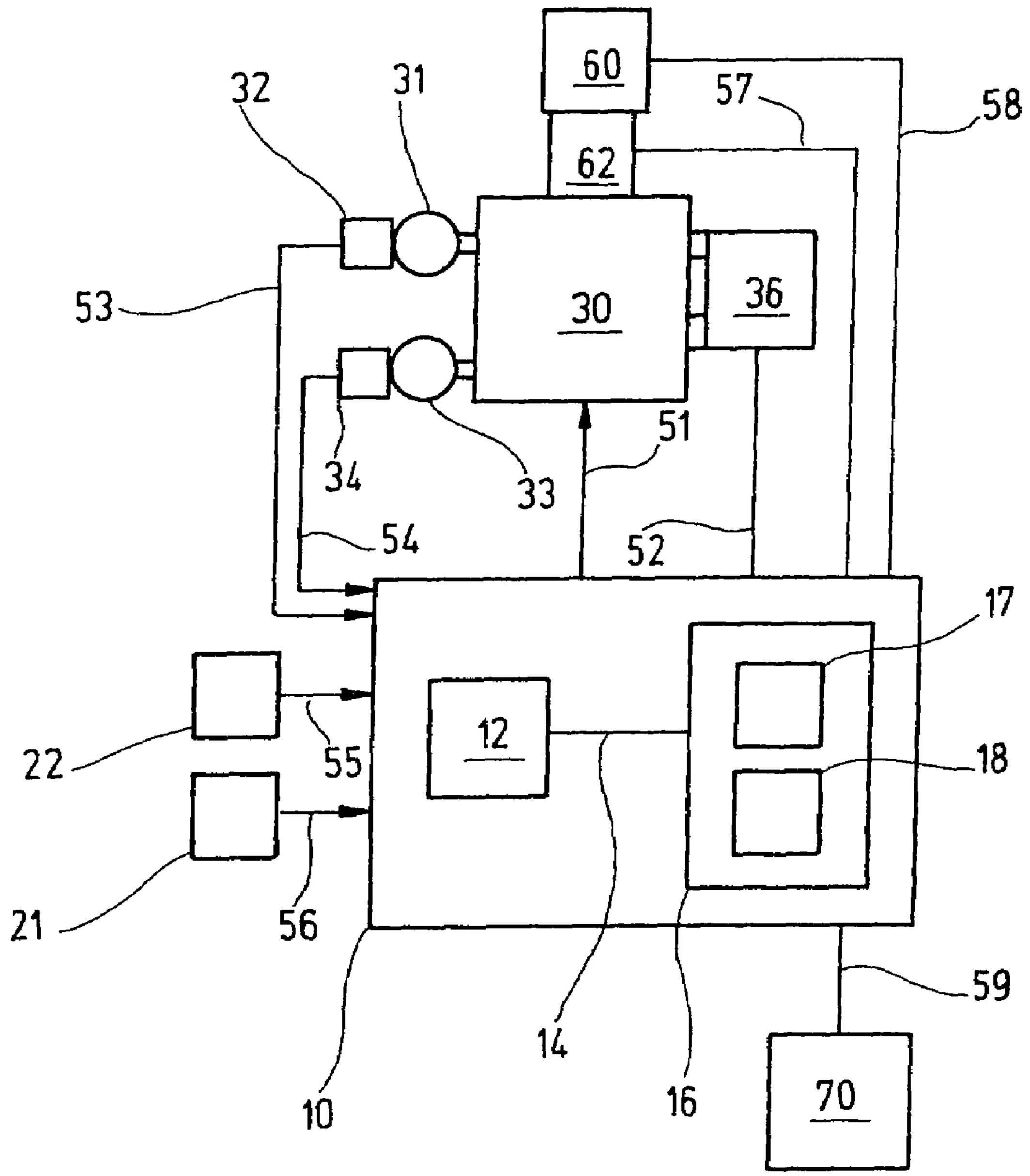
FIG. 1 shows a schematic representation of a control unit and an internal combustion engine controlled thereby.

FIG. 1 shows a control unit 10 that includes a microprocessor 12 and a memory element 16 that is connected thereto via a bus system 14. Memory element 16 has a memory area 17 and a memory area 18. Memory area 17 may be designed, for example, as a read-only memory (ROM) and memory area 18 as a random-access memory. A device for detecting a start request probability, which may be designed as a door contact switch 22, is connected to control unit 10 via a data line 55. For example, a device for detecting the occupation of a driver's seat, a motion sensor for detecting the presence of a driver or a device for detecting the process of unlocking the driver's door (for example, a signal of the central locking system) may be used instead of a door contact switch 22.

A device for detecting a start request, which is designed, for example, as an ignition switch 21, is connected to control unit 10 via a data line 56.

Control unit 10 controls an internal combustion engine 30 which has a camshaft 31 and a crankshaft 33. Camshaft 31 and crankshaft 33 are each assigned a rotation angle sensor 32 and 34 which are connected to the control unit via data lines 53, 54. An electric motor 36, which is controllable by control unit 10 and may be designed as a starter or starter/generator, is also connected to internal combustion engine 30.

An automatic clutch 62 and an automatic transmission 60, which are connected to control unit 10 via data lines 57, 58, are also assigned to internal combustion engine 30. It is also possible for the internal combustion engine to be assigned an automated clutch instead of automatic clutch 62 and an automated transmission instead of automatic transmission 60. Automated clutches and automated transmissions are used, for example, for manual transmissions that may be operated electrohydraulically.

Figure 2:
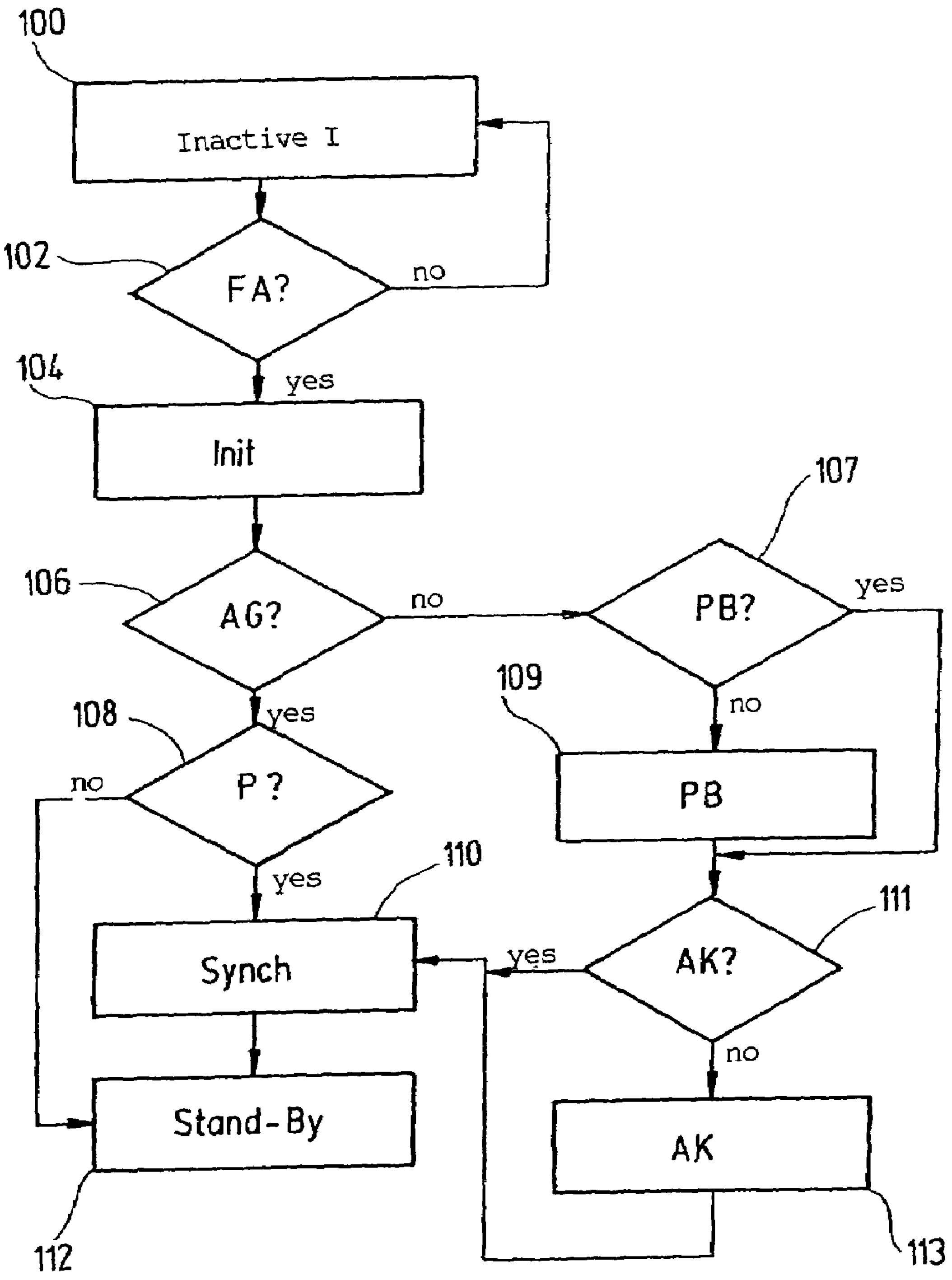
FIG. 2 shows a first part of a schematic flowchart of the method according to the present invention.

The highly schematic flowchart illustrated in FIG. 2 shows a method for initializing control unit 10.

The method for initializing and synchronizing control unit 10 illustrated in FIG. 2 begins in a step 100 in which control unit 10 is in a first inactive mode (Inactive I).

In an example method according to the present invention, control unit 10 is initialized and synchronized with internal combustion engine 30 upon detection of a start request probability, that is, even before the driver actually issues a start request by turning the ignition key or operating a starter switch.

For this purpose, a step 102 checks whether a driver is present and thus whether the probability of a start request is deducible. This is done, for example, by evaluating a signal transmitted by door contact switch 22 to control unit 10 via data line 55. It is assumed that a start request probability is present when a driver opens the driver's door. However, information indicating, for example, that the driver's door has been unlocked may also be evaluated. Likewise, it is possible to evaluate information from an airbag control unit that determines whether the driver's seat is occupied. It is further possible to use a combination of multiple signals from different detecting devices to more precisely determine a start request probability.

If a start request probability is detected in step 102, control unit 10 switches, in a step 104, to an init mode in which the initialization of control unit 10 begins. This initialization process includes, for example, initialization of microprocessor 12 (reading and setting of certain register contents), start of execution of a computer program stored in a memory area (for example, memory area 17) of memory element 16, performance of a self-test of the control unit, or verification of the operability of sensors (21, 22, 32, 34) connected to the control unit, or verification of the operability of actuators connected to the control unit.

A step 106 checks whether the vehicle has an automatic transmission 60. If so, a step 108 checks whether automatic transmission 60 is in the parking position, which prevents the vehicle from rolling, since the driven wheels are locked. If this is the case, internal combustion engine 30 is synchronized with control unit 10 in a step 110. To carry out the synchronization, control unit 10 activates an electric motor 36, for example a starter or a starter/generator, which places internal combustion engine 30 in motion. The position of the first cylinder is detected (cylinder 1 detection) in step 110 as a function of the camshaft and/or crankshaft angles detected by sensors 32, 34. This may require up to two crankshaft rotations. After synchronization has been carried out, control unit 10 switches to standby mode in step 112.

If automatic transmission 60 was not in the parking position in step 108, the control unit switches directly from there to standby mode. This means that synchronization is not carried out because this could set the vehicle in motion. If a start request is now indeed issued, control unit 10 must still be synchronized with internal combustion engine 30, although the remaining initialization operations, for example loading various programs and a self-test, have already been carried out in step 104. In this case as well, the starting process is shortened.

If the vehicle does not have an automatic transmission 60, the method branches from step 106 to step 107. This step checks whether electric parking brake 70 has been activated. If so, the method branches to a step 111. If this is not the case, however, electric parking brake 70 is activated by control unit 10 in a step 109.

Step 111 checks whether automatic clutch 62 is disengaged. If so, the method branches to step 110. If not, the automatic clutch is disengaged by control unit 10 in a step 113, after which the method branches to step 110. The clutch must be disengaged to set the internal combustion engine 30 in motion without also setting the vehicle in motion.

Figure 3:
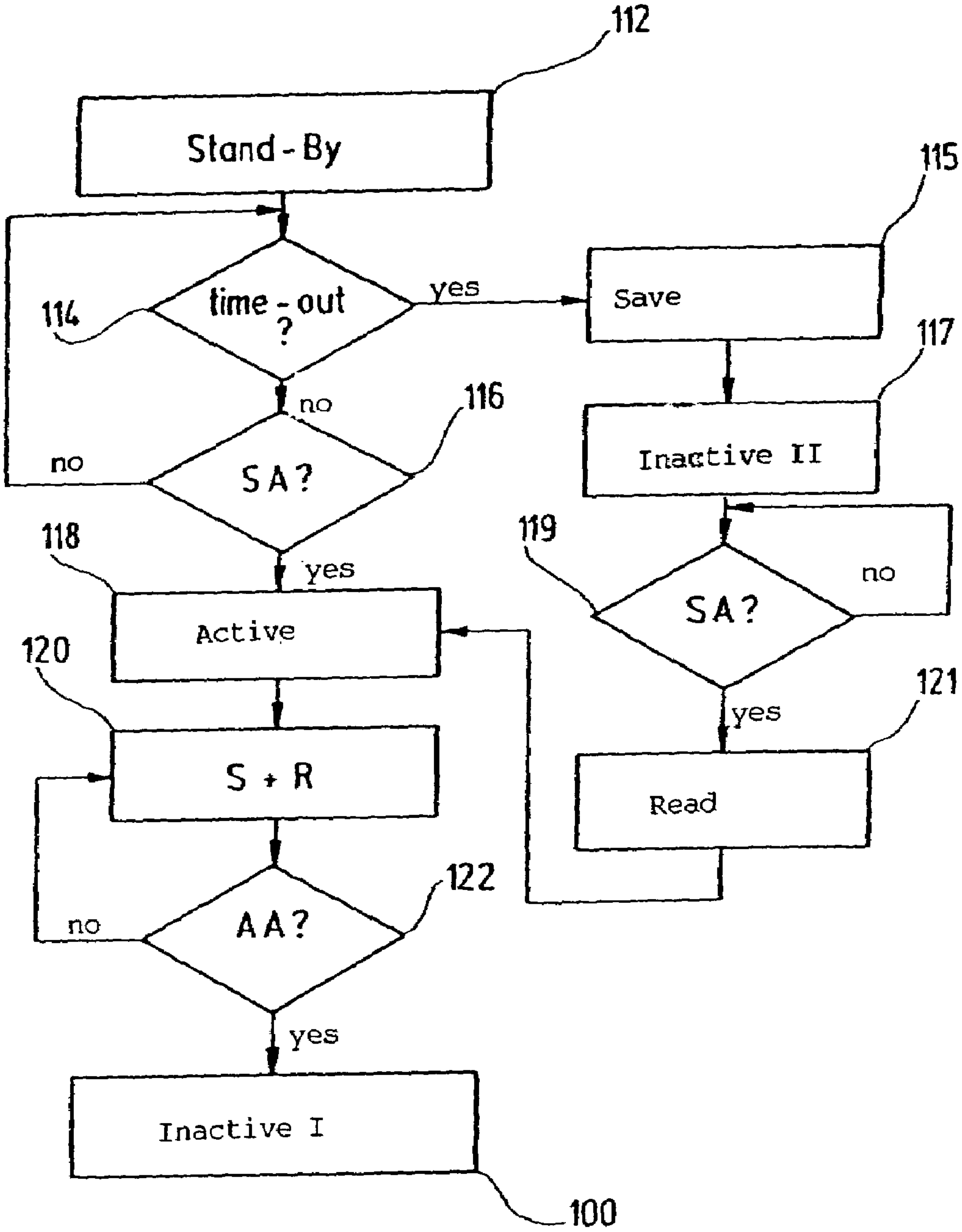
FIG. 3 shows a second part of the schematic flowchart from FIG. 2.

FIG. 3 shows a schematic representation of the continuation of the method described in FIG. 2.

In step 112, control unit 10 is in standby mode. A step 114 checks whether a predefinable period of time has been exceeded (timeout). This period of time is advantageously selected so that a start request by the user should no longer be expected at the end of this period.

If this period of time has not yet been exceeded, a step 116 checks whether a start request has been issued, for example by operating ignition switch 21. If no start request is present, the method branches back to step 114. However, if a start request is present, the control unit is activated in a step 118 so that the operation of the internal combustion engine may be controlled and regulated. To do this, for example, characteristic maps provided for this purpose are loaded, computer programs are executed, values transmitted by sensors are evaluated, and any actuators present are suitably activated.

If the predefinable period of time was exceeded in step 114, the data describing the synchronization carried out in step 110 is stored in memory area 18 of control unit 10 in a step 115. Control unit 10 then switches to a second inactive mode (Inactive II) in a step 117 to avoid unnecessary power consumption. A step 119 subsequently checks whether a start request is present. This step 119 continues to be carried out until a start request is detected. In this case, the data stored in step 115 is read again in a step 121, and the method resumes in step 118 by activating control unit 10.

The second inactive mode (Inactive II) of control unit 10 resulting from step 117 differs from the first inactive mode (Inactive I) shown in step 100 by the fact that internal combustion engine 30 is already synchronized with control unit 10 in the second inactive mode, and the corresponding data has been stored. If a start request is present while control unit 10 is in the second inactive mode (Inactive II), it is not necessary to repeat the synchronization.

Internal combustion engine 30 is then started in a step 120, and its operation is controlled and regulated by control unit 10. This continues until the presence of a shut-down request is detected in a step 122, for example by turning the ignition key to position 0.

If this is the case, internal combustion engine 30 is shut down, and control unit 10 switches back to the first inactive mode (Inactive I) in step 100. From there the method continues as described above in FIG. 2.

What is claimed is:

1. A method for initializing a control unit for controlling an internal combustion engine in a vehicle, comprising:

detecting a start request probability as a function of a signal of a detecting device, a start request being detected as a function of a signal of a further detecting device; and performing, as a function of the detected start request probability, the following steps:

checking the vehicle, ensuring an interruption in a flow of power between the internal combustion engine and driven wheels, setting the internal combustion engine in motion by an electric motor, synchronizing the control unit with the internal combustion engine so that the control unit detects a position of the internal combustion engine, deactivating the electric motor, and switching the control unit to a standby mode, the control unit waiting for a start request.

2. The method as recited in claim 1, further comprising: securing the vehicle to prevent rolling.

3. The method as recited in claim 1, further comprising:

storing data describing the synchronization of the internal combustion engine with the control unit; and switching the control unit to an inactive mode unless a start request is detected within a predefinable period of time.

4. The method as recited in claim 3, wherein a synchronization of the control unit with the internal combustion engine takes place only if no data describing the synchronization are stored.

5. The method as recited in claim 3, further comprising:

switching the control unit to an active mode upon detection of the start request; and reading the stored data describing the synchronization of the internal combustion engine with the control unit when the control unit switches from the inactive mode to the active mode.

6. The method as recited in claim 1, wherein the performing step is performed only if the detected start request probability exceeds a predefinable value, the start request probability exceeding the predefinable value if at least one of a driver's door is opened, and a driver's seat is occupied.

7. The method as recited in claim 1, wherein the vehicle includes an automated or an automatic transmission, and wherein locking of the driven wheels is ensured when the automated or automatic transmission is in a parking position.

8. The method as recited in claim 1, wherein the vehicle includes an automated or an automatic clutch, wherein the flow of power between the internal combustion engine and the driven wheels is interrupted by activating the automated or automatic clutch.

9. The method as recited in claim 2, wherein the vehicle includes an electric parking brake and wherein the vehicle is secured to prevent rolling by activating the electric parking brake.

10. A control unit in an internal combustion engine in a vehicle, an arrangement configured to detect a start request probability and an arrangement configured to detect a start request being assigned to the control unit, the control unit comprising:

an arrangement configured to perform the following steps as a function of a detected start request probability:

checking the vehicle;

ensuring an interruption in a flow of power between the internal combustion engine and driven wheels;

setting the internal combustion engine in motion by an electric motor;

synchronizing the control unit with the internal combustion engine so that the control unit detects a position of the internal combustion engine;

deactivating the electric motor; and switching the control unit to a standby mode, the control unit waiting for a start request.

11. A storage device storing a computer program, which, when executed on a microprocessor in a vehicle having an internal combustion engine, causes the microprocessor to perform:

performing, as a function of a detected start request probability, the following steps:

checking the vehicle;

ensuring an interruption in a flow of power between the internal combustion engine and driven wheels;

setting the internal combustion engine in motion by an electric motor;

synchronizing a control unit with the internal combustion engine so that the control unit detects a position of the internal combustion engine;

deactivating the electric motor; and switching the control unit to a standby mode, the control unit waiting for a start request.

12. The computer program as recited in claim 11, wherein the storage device is stored is one of a random-access memory (RAM), a read-only memory (ROM) or a flash memory.

* * * * *